(12) United States Patent
Bernat et al.

(10) Patent No.: US 11,196,837 B2
(45) Date of Patent: Dec. 7, 2021

(54) TECHNOLOGIES FOR MULTI-TIER PREFETCHING IN A CONTEXT-AWARE EDGE GATEWAY

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Petar Torre, Feldkirchen (DE); Ned Smith, Beaverton, OR (US); Brinda Ganesh, Portland, OR (US); Evan Custodio, North Attleboro, MA (US); Suraj Prabhakaran, Aachen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/369,384

(22) Filed: Mar. 29, 2019

(65) Prior Publication Data

US 2019/0230191 A1    Jul. 25, 2019

(51) Int. Cl.
*H04L 12/911*    (2013.01)
*H04L 29/08*    (2006.01)
*H04L 12/66*    (2006.01)

(52) U.S. Cl.
CPC .............. *H04L 67/32* (2013.01); *H04L 12/66* (2013.01); *H04L 47/70* (2013.01); *H04L 67/2847* (2013.01); *H04L 67/2885* (2013.01); *H04L 67/325* (2013.01)

(58) Field of Classification Search
None
See application file for complete search history.

(56) References Cited

U.S. PATENT DOCUMENTS

| | | | |
|---|---|---|---|
| 3,226,675 A | 12/1965 | Edwards | |
| 5,826,239 A | 10/1998 | Du et al. | |
| 5,941,947 A | 8/1999 | Brown et al. | |
| 6,038,625 A | 3/2000 | Ogino et al. | |
| 6,160,796 A | 12/2000 | Zou | |

(Continued)

FOREIGN PATENT DOCUMENTS

| | | |
|---|---|---|
| EP | 1988684 | 5/2008 |
| WO | 199859478 | 12/1998 |

OTHER PUBLICATIONS

Gezer et al., "An Introduction to Edge Computing and A Real-Time Capable Server Architecture," International Journal of Intelligent Systems, Jul. 2018, 11 pages.

(Continued)

*Primary Examiner* — Joshua Joo
(74) *Attorney, Agent, or Firm* — Hanley, Flight & Zimmerman, LLC

(57) ABSTRACT

Technologies for fulfilling service requests in an edge architecture include an edge gateway device to receive a request from an edge device or an intermediate tier device of an edge network to perform a function of a service by an entity hosting the service. The edge gateway device is to identify one or more input data to fulfill the request by the service and request the one or more input data from an edge resource identified to provide the input data. The edge gateway device is to provide the input data to the entity associated with the request.

16 Claims, 6 Drawing Sheets

(56) References Cited

U.S. PATENT DOCUMENTS

| | | |
|---|---|---|
| 6,363,434 B1 | 3/2002 | Eytchison |
| 6,452,935 B1 | 9/2002 | Gibbs |
| 6,460,082 B1 | 10/2002 | Lumelsky et al. |
| 6,542,474 B1 | 4/2003 | Lau |
| 6,618,764 B1 | 9/2003 | Shteyn |
| 6,636,505 B1 | 10/2003 | Wang et al. |
| 6,889,188 B2 | 5/2005 | Metzler et al. |
| 6,916,247 B2 | 7/2005 | Gatto et al. |
| 6,948,168 B1 | 9/2005 | Kuprionas |
| 6,961,941 B1 | 11/2005 | Nelson et al. |
| 6,973,473 B1 | 12/2005 | Novaes et al. |
| 6,990,379 B2 | 1/2006 | Gonzales et al. |
| 7,039,701 B2 | 5/2006 | Wesley |
| 7,069,318 B2 | 6/2006 | Burbeck et al. |
| 7,072,960 B2 | 7/2006 | Graupner et al. |
| 7,143,139 B2 | 11/2006 | Burbeck et al. |
| 7,167,920 B2 | 1/2007 | Traversal et al. |
| 7,171,471 B1 | 1/2007 | Nair |
| 7,177,929 B2 | 2/2007 | Burbeck et al. |
| 7,181,523 B2 | 2/2007 | Sim |
| 7,181,536 B2 | 2/2007 | Burbeck et al. |
| 7,206,934 B2 | 4/2007 | Pabla et al. |
| 7,251,689 B2 | 7/2007 | Wesley |
| 7,263,560 B2 | 8/2007 | Abdelaziz et al. |
| 7,325,047 B2 | 1/2008 | Brittenham et al. |
| 7,386,860 B2 | 6/2008 | Dani et al. |
| 7,412,538 B1 | 8/2008 | Eytchison et al. |
| 7,426,730 B2 | 9/2008 | Mathews et al. |
| 7,472,349 B1 | 12/2008 | Srivastava et al. |
| 7,519,918 B2 | 4/2009 | Trantow |
| 7,599,827 B2 | 10/2009 | Hardwick et al. |
| 7,603,469 B2 | 10/2009 | Fletcher et al. |
| 8,356,067 B2 | 1/2013 | Trantow |
| 2002/0062417 A1 | 5/2002 | Rudland et al. |
| 2002/0078259 A1 | 6/2002 | Wendorf et al. |
| 2002/0083143 A1 | 6/2002 | Cheng |
| 2002/0112058 A1 | 8/2002 | Weisman et al. |
| 2002/0143819 A1 | 10/2002 | Han et al. |
| 2003/0005130 A1 | 1/2003 | Cheng |
| 2003/0036917 A1 | 2/2003 | Hite et al. |
| 2003/0055624 A1 | 3/2003 | Fletcher et al. |
| 2003/0061256 A1 | 3/2003 | Mathews et al. |
| 2003/0065756 A1 | 4/2003 | Carrez |
| 2003/0084156 A1 | 5/2003 | Graupner et al. |
| 2003/0110334 A1 | 6/2003 | Lanigan et al. |
| 2003/0163513 A1 | 8/2003 | Schaeck et al. |
| 2003/0182394 A1 | 9/2003 | Ryngler et al. |
| 2003/0191802 A1 | 10/2003 | Zhao et al. |
| 2003/0229900 A1 | 12/2003 | Reisman |
| 2004/0003033 A1 | 1/2004 | Kamen et al. |
| 2004/0030740 A1 | 2/2004 | Stelting |
| 2004/0221001 A1 | 11/2004 | Anagol-Subbarao et al. |
| 2004/0268407 A1 | 12/2004 | Sparrell et al. |
| 2005/0108354 A1 | 5/2005 | Lisitsa et al. |
| 2010/0146569 A1* | 6/2010 | Janardhan ......... H04N 7/17318 725/98 |
| 2011/0213800 A1* | 9/2011 | Saros ................ G06Q 30/02 707/769 |
| 2012/0208500 A1* | 8/2012 | Ledlie ............... H04M 1/67 455/410 |
| 2014/0279520 A1* | 9/2014 | Armstrong ......... G06Q 20/4012 705/44 |
| 2016/0072821 A1* | 3/2016 | Wu ................ H04L 63/0869 726/4 |
| 2017/0064029 A1* | 3/2017 | Das ................ H04W 4/18 |
| 2019/0044886 A1 | 2/2019 | Bernat et al. |
| 2020/0153853 A1* | 5/2020 | Manthena ........... G06F 21/552 |
| 2020/0213419 A1* | 7/2020 | Ren ................ H04W 28/08 |
| 2020/0259878 A1* | 8/2020 | Yang ............... H04L 67/00 |

OTHER PUBLICATIONS

Nallur et al., "A Decentralized Self-Adaptation Mechanism for Service-Based Applications in the Cloud," IEEE Transactions on Software Engineering, May 2013, 24 pages.

* cited by examiner

TECHNOLOGIES FOR MULTI-TIER PREFETCHING IN A CONTEXT-AWARE EDGE GATEWAY

BACKGROUND

Edge computing provides techniques for processing resources at a location in closer network proximity to a requesting device, as opposed to a centralized location in a cloud network. Doing so ensures that devices receive critical data relatively quickly. For example, a common use case in edge computing is with autonomous vehicles. An autonomous vehicle, in operation, may require, within a short time frame, data indicative of up-to-date road conditions to make safe navigation decisions. The autonomous vehicle may connect with an edge network to make a request. In making the request, the autonomous vehicle may send a variety of inputs (e.g., identifying information for the vehicle, current location data, type of data requested, etc.), which the service provider on the edge network may process. The service provider may fulfill the request and send the requested data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
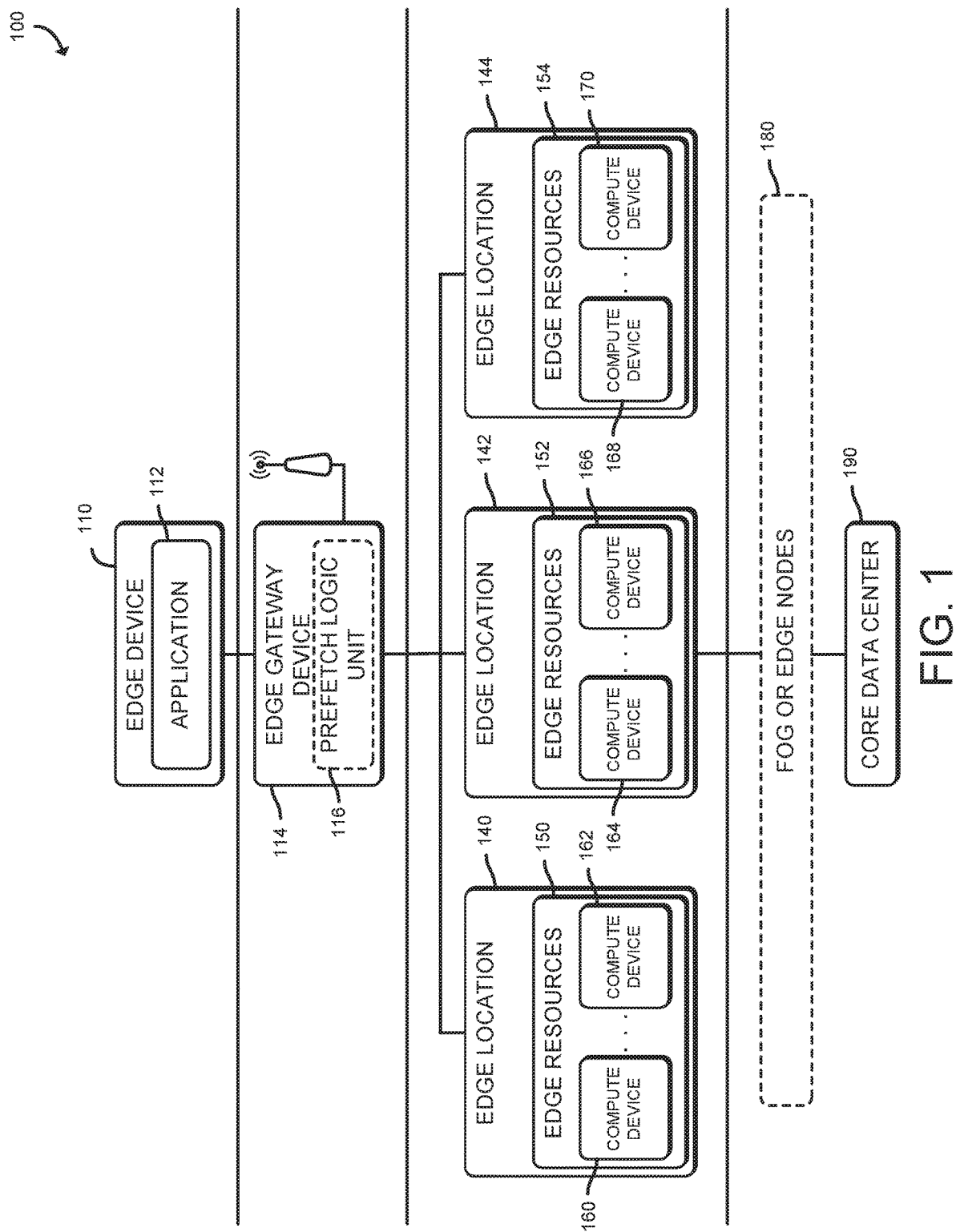
FIG. 1 is a simplified diagram of at least one embodiment of a system for multi-tier prefetching of edge resources from one or more edge locations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for multi-tier prefetching of edge resources from one or more edge locations includes an edge device 110 in communication with an edge gateway device 114. The edge gateway device 114 may be embodied as any computing device capable of communicating data between the edge device 110 and one or more edge resources 150, 152, 154 (e.g., resources, such as compute devices and the components thereof, owned and/or operated by one or more service providers, such as cellular network operators) or other compute devices located in a cloud. Further, the edge gateway device 114, in the illustrative embodiment, is configured to receive and respond to requests from the edge device 110 regarding characteristics of the edge resources 150, 152, 154, such as architectures of processors, accelerator devices, and/or other components in the edge resources 150, 152, 154 (e.g., in compute devices 160, 162, 164, 166, 168, 170), latencies, power usage, and costs (e.g., monetary costs) associated with utilizing those edge resources 150, 152, 154. The edge gateway device 130 and the edge resources 150, 152, 154, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. Further, the system 100 may be organized in a hierarchical structure having multiple tiers. For example, a given tier may include the aforementioned edge computing devices, e.g., edge computing devices in locations (e.g., locations 140, 142, 144) that are of a similar network proximity to the edge device 110. A next tier may include cell towers and base stations providing edge resources. The following tier may include a central office station in a core data center 190.

It should be appreciated that, in some embodiments, the edge network may form a portion of or otherwise provide an ingress point into a fog network (e.g., fog or edge nodes 180), which may be embodied as a system-level horizontal architecture that distributes resources and services of computing, storage, control and networking anywhere between a core data center 190 (e.g., a data center that is further away from and in a higher level of the hierarchy of the system 100 than the edge resources 150, 152, 154, and that includes multiple compute devices capable of executing one or more services (e.g., processes on behalf of one or more clients)) and an endpoint device (e.g., the edge device 110).

In an embodiment, the edge device 110 executes an application 112 (e.g., using a processor and/or accelerator device(s)) included therein. The application 112 may include one or more services or workloads for processing. For example, assume that the edge device 110 is representative of an autonomous vehicle connected to the edge network forming the system 100. The application 112 may include various functions for ensuring normal operation of the autonomous vehicle, such as location, navigation, and other functions used to operate the vehicle. Further, the application 112 may request data from services provided by edge resources 150, 152, or 154. Generally, the edge gateway device 114 may receive such requests. The edge gateway device 114 may thereafter evaluate the request and forward the request to an appropriate service at an edge location 140, 142, or 144 (or to the fog or edge nodes 180 or core data center 190).

Typically, when processing a given request, the service receiving the request may identify input data required to service the request. For example, an image database service executing at a given edge location may handle image comparison requests using image data as input. The service may require additional inputs (e.g., additional image data) to completely process the request. These additional inputs may be stored with other sources, such as an image database service at another edge location or in the core data center 190. Retrieving such additional inputs upon receiving the request can be time-consuming and may affect total cost of ownership (TCO) for the service.

Further, typically, data requested by the edge device 110 may be located in different edge locations or in different tiers of the system 100. Continuing the example of the image database service provided at a given edge location, the edge device 110 may be in motion (e.g., in cases in which the edge device 110 represents an autonomous vehicle). The edge device 110 may send requests to the image database service to identify objects (e.g., traffic signs, potential hazards, and the like) while in operation. The edge device 110 may continuously send requests to a given edge location while the edge device 110 is in network proximity of the edge location. However, once the edge device 110 is out of range of that edge location, the edge device 110 may send the requests targeting another edge location that may be of closer network proximity. To preserve quality of service (QoS) and ensure efficient handling of the requests, it may be desirable for the new edge location to prepare for such requests in advance of receiving those requests.

As further described herein, the edge gateway device 114 is configured to coordinate with edge computing devices (e.g., the edge resources 150, 152, 154) and other entities of the system 100 (e.g., the fog or edge nodes 180 and the core data center 190) to more efficiently process requests sent by an edge device 110 (or at a device at an intermediate tier situated between the edge device 110 and the entity hosting a requested service) to services provided by edge resources in the system 100. For instance, in the illustrative embodiment, the edge gateway device 114 includes a prefetch logic unit 116. The prefetch logic unit 116 may be embodied as any device and/or circuitry (e.g., a co-processor, an application specific integrated circuit (ASIC), a field programmable gate array (FPGA), etc.) configured to provide an interface (e.g., an application programming interface (API)) for an edge device 110 to communicate requests for edge resources. More particularly, the prefetch logic unit 116 enables the edge device 110 (or a compute device processing service requests at an intermediate tier of the system 100) to send requests to the edge gateway 110 to prefetch data by a target entity (e.g., one of the compute devices 160, 162, 164, 166, 168, 170) at a given edge location. For example, the edge device 110 may currently be sending requests to a service provided at edge location 140. The edge device 110 may send a request to the edge gateway device 114 to prefetch data by edge resources 152 in the edge location 142. The prefetch logic unit 116 may forward the request to the edge resources 152 to prefetch the data, in the event that the edge resources 152 are able to service the request in advance.

Further, the interface provided by the prefetch logic unit 116 allows the edge gateway device 114 to, in response to receiving a request by an edge device 110 to forward to a service hosted by a given entity, identify one or more additional inputs required to fulfill the request by that service. More particularly, the prefetch logic unit 116 may include preprocessing code associated with each service (e.g., previously registered with the edge gateway device 114) that the prefetch logic unit 116 executes upon receiving a request from the edge device 110. The preprocessing code is used to determine edge resources in the system 110 that provide additional inputs to fulfill a given service request. The preprocessing code, when executed, also requests and obtains the additional inputs from the edge resources. The prefetch logic unit 116 may then provide the additional inputs to the entity associated with the request.

Figure 2:
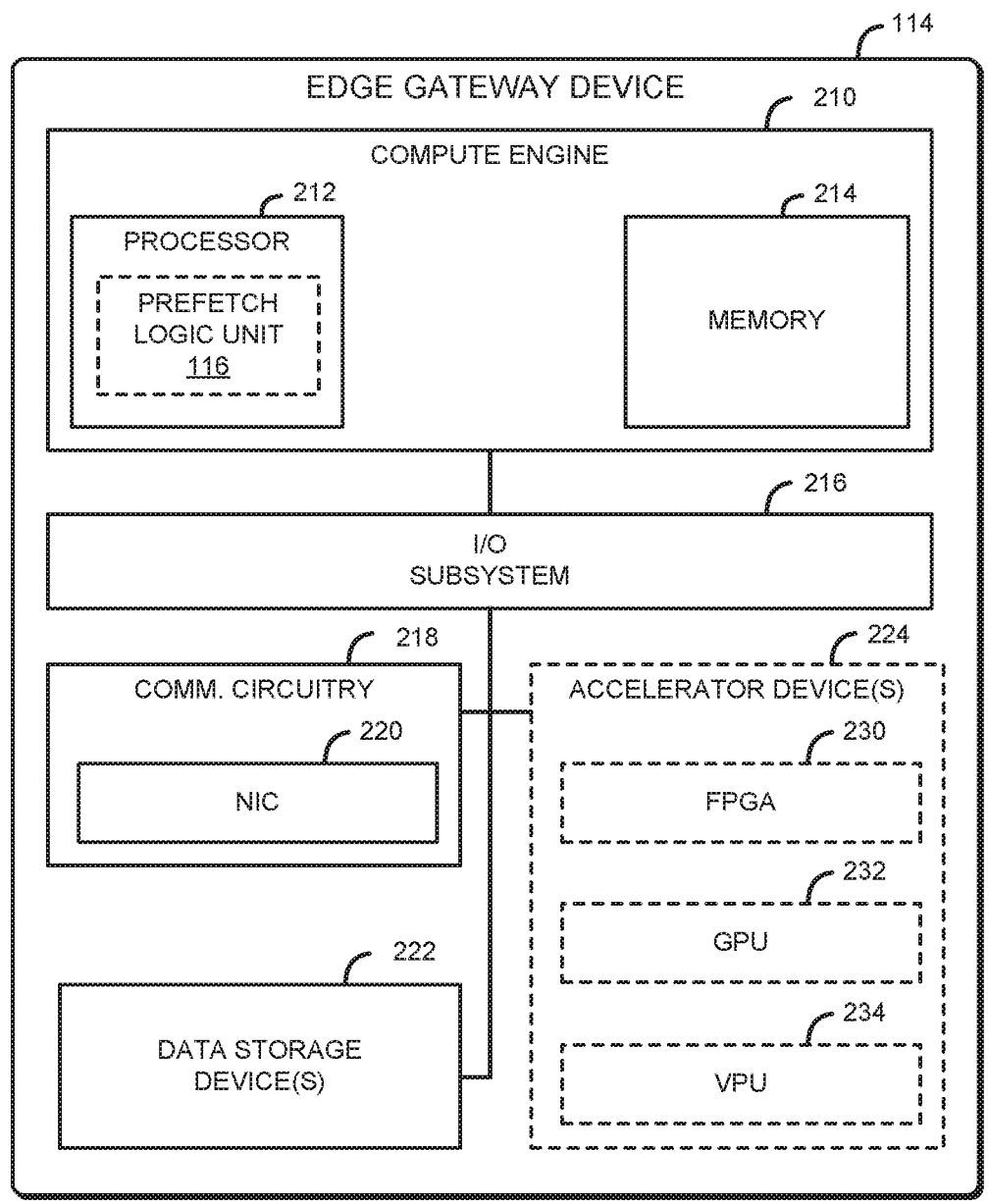
FIG. 2 is a simplified block diagram of at least one embodiment of the edge gateway device described relative to FIG. 1.

Referring now to FIG. 2, the illustrative edge gateway device 114 includes a compute engine (also referred to herein as "compute engine circuitry") 212, an input/output (I/O) subsystem 216, communication circuitry 218, and one or more data storage devices 222. As described herein, the edge gateway device 114 may also include one or more accelerator devices 224. Of course, in other embodiments, the edge gateway device 114 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein (e.g., processing service requests to edge resources of an edge device 110). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, a virtualized version thereof, or other specialized hardware to facilitate performance of the functions described herein. The illustrative processor 212 may include the prefetch logic unit 116, described above with reference to FIG. 1. The edge gateway device 114 may be embodied as one or more physical compute devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer).

The memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 214 may be integrated into the processor 212. In operation, the memory 214 may store various software and data used during operation such as one or more applications, data operated on by the application(s), libraries, and drivers.

The compute engine 210 is communicatively coupled to other components of the edge gateway device 114 via the I/O subsystem 216, which may be embodied as circuitry and/or components to facilitate input/output operations with the compute engine 210 (e.g., with the processor 212 and/or the memory 214) and other components of the edge gateway device 114. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the memory 214, and other components of the edge gateway device 114, into the compute engine 210.

The communication circuitry 218 may be embodied as any communication circuit, device, or collection thereof, capable of enabling communications over a network between the edge gateway device 114 and another compute device (e.g., the edge device 110, the edge resources 150, 152, 154, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the edge gateway device 114 to connect with another compute device (e.g., the edge device 110, the edge resources 150, 152, 154, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the edge gateway device 114 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations (e.g., machine learning and artificial intelligence (AI) operations) faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision.

The edge resources 150, 152, 154 (e.g., the compute devices 160, 162, 164, 166, 168, 170), the edge device 110, the fog nodes 180, and the core data center 190 may have components similar to those described in FIG. 2 with reference to the edge gateway device 114. The description of those components of the edge gateway device 114 is equally applicable to the description of components of the edge resources 150, 152, 154 (e.g., the compute devices 160, 162, 164, 166, 168, 170), the edge device 110, the fog nodes 180, and the core data center 190, with the exception that, in some embodiments, the prefetch logic unit 116 is not included in devices other than the edge gateway device 114. Further, it should be appreciated that any of the edge resources 150, 152, 154 (e.g., the compute devices 160, 162, 164, 166, 168, 170), the edge device 110, the fog nodes 180, and the core data center 190 may include other components, sub-components, and devices commonly found in a computing device, which are not discussed above in reference to the edge gateway device 114 and not discussed herein for clarity of the description. Further, it should be understood that one or more components of a compute device may be distributed across any distance, and are not necessarily housed in the same physical unit.

The edge gateway device 114, edge resources 150, 152, 154 (e.g., the compute devices 160, 162, 164, 166, 168, 170), the edge device 110, the fog nodes 180, and the core data center 190 are illustratively in communication via a network, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
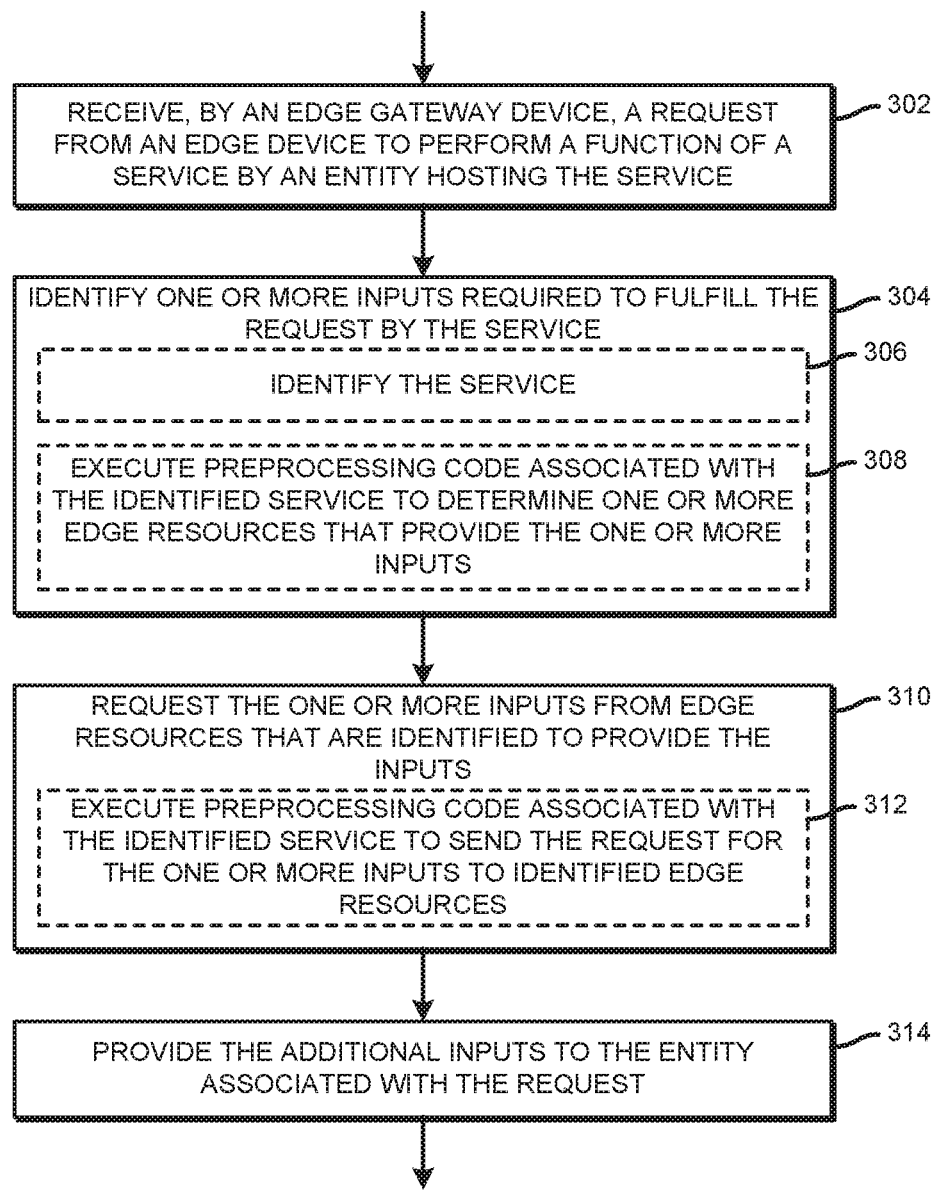
FIG. 3 is a simplified flow diagram of at least one embodiment of a method that may be performed by the edge gateway device of FIG. 1 for obtaining, based on the context of a request, inputs to service the request.

Referring now to FIG. 3, the edge gateway device 114, in operation, may execute a method 300 for obtaining, based on the context of a request, inputs to service the request. As shown, the method 300 begins in block 302, in which the edge gateway device 114 receives a request from an edge device (e.g., an edge device 110) to forward to a given entity hosting a service. The request may specify the service and other parameters, such as a type of the edge device 110, location information associated with the edge device 110, QoS deadlines, and the like. Further, an entity may refer to any of the devices of the system 100, such as other edge devices 110, compute devices providing edge resources 150, 152, 154, the fog or edge nodes 180, or the core data center 190. The edge gateway device 114 may forward the request to the service.

In block 304, the edge gateway device 114 evaluates the request and identifies one or more additional inputs that are required to fulfill the request by the service. More specifically, the edge gateway device 114 determines whether any additional inputs may be required that are not necessarily maintained or stored by the entity hosting the service. For example, assume that a smart city includes multiple edge devices (e.g., an Internet-of-Things (IoT) device) having sensors that observe data. An edge device, such as a smart traffic light, may rely on input data from multiple edge sources (e.g., other edge devices 110, edge resources 150, 152, 154, and the like), such as traffic data from nearby smart traffic lights, traffic data from autonomous vehicles communicating with the system 100, and so on.

To identify the one or more additional inputs, in block 306, the edge gateway device 114 may identify the service specified in the request. The edge gateway device 114 may map a service identifier to preprocessing code stored on the edge gateway device 114 used to determine the inputs required by the service. The preprocessing code may be an executable or a bit stream function (e.g., a Function-as-a-Service bit stream) that may be executed by the edge gateway device 114 and may be stored on the edge gateway device 114. In block 308, the edge gateway device 114 executes preprocessing code associated with the identified service to determine one or more edge resources that provide the one or more inputs. The determination may be predefined or may apply historically provided inputs from other requests fulfilled by the service. The determination may account for tiers, e.g., inputs located in higher tiers (e.g., the core data center 190) that are of higher priority to retrieve in advance. The resulting determination may include an indication of the input data located in various tiers of the system 100 and which devices may be providing the input data.

In block 310, the edge gateway device 114 requests the one or more inputs from the identified edge resources. To do so, the edge gateway device 114 may execute preprocessing code associated with the identified service used to communicate with the edge resources. For example, the preprocessing code may invoke one or more API functions to request and receive the additional data from the edge resources. The functions may provide parameters that may be included with the request, such as QoS deadlines, a time range for the requested data, a present location of the requesting edge device 110, etc.

Once received, in block 314, the edge gateway device 114 provides the additional inputs to the entity associated with the request. By sending the additional input data to the entity in advance, doing so eliminates the need for the entity to determine the required input data and request the data from the edge resources that provide such data. As a result, the underlying service hosted by the entity may perform the requested function using fewer network resources. Further, the edge gateway device 114 may impose more efficient load balancing and orchestration schemes as a result.

In some cases, the edge gateway device 114 might not have access to determining one or more of the additional inputs due to end-to-end encrypted workloads. To address such a case, the edge gateway device 114 may provide a publish-subscribe notification system (e.g., using various techniques such as MQTT (Message Queuing Telemetry Transport) to do so) for relevant context that is independent of the workload data. The edge gateway device 114 may subscribe to context topics that are relevant to gateway routing efficiency. For example, if a first compute device at an edge location needs access to resources from a second compute device at another edge location, the first compute device subscribes associated with the second compute device at that other edge location. The edge gateway device 114 also subscribes to the topic. The first compute device may publish to the topic once it detects that resources from the second compute device are needed. The edge gateway device 114 may, upon detecting the publishing of the topic, allocate resources to process the messages. Doing so includes forwarding a notification to the second compute device to wake the device and allocate processing resources. Since notification messages typically are not the end-to-end data, the messages are not end-to-end encrypted and thus the edge gateway device 114 is trusted with the notification traffic but not the actual data.

Figure 4:
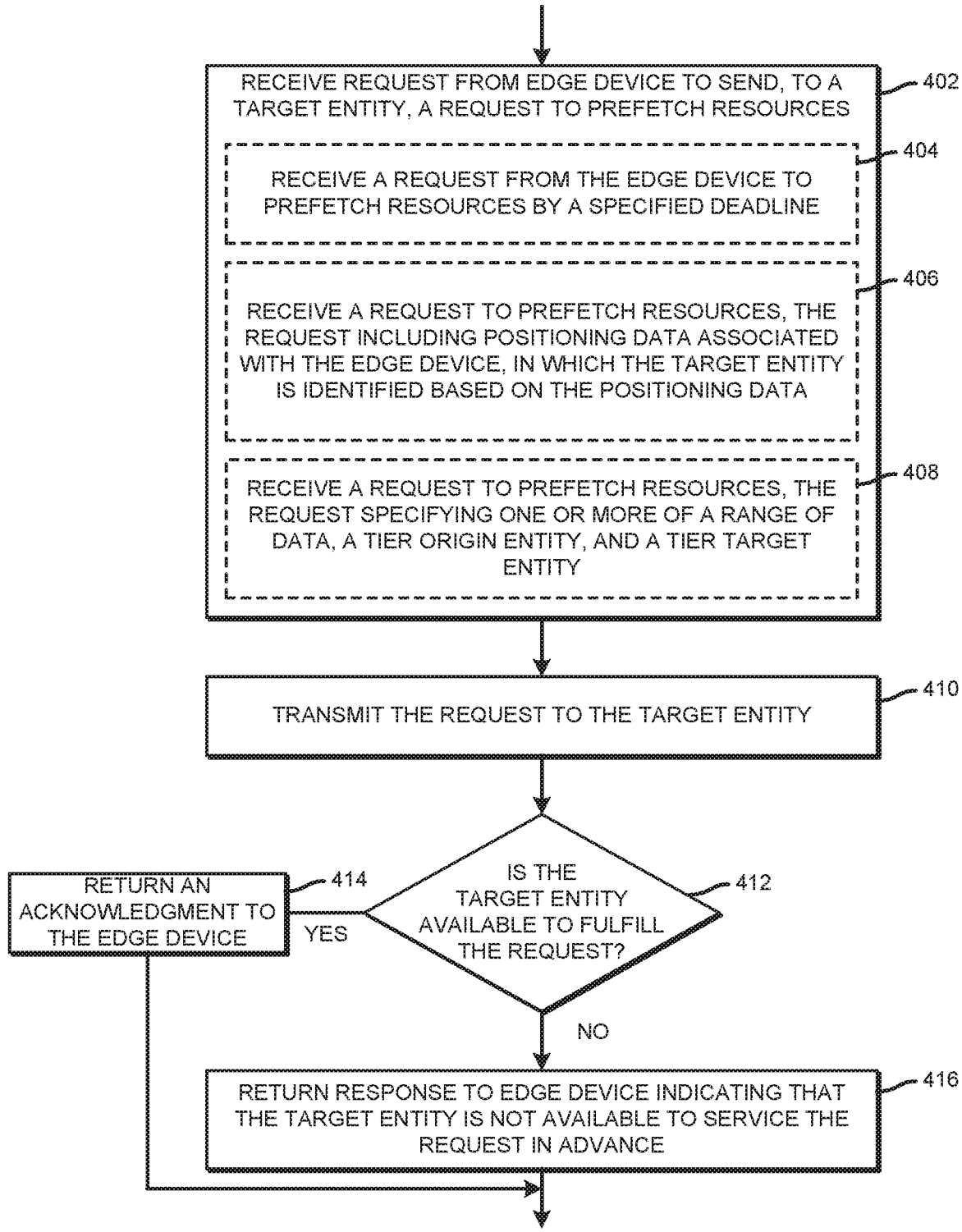
FIG. 4 is a simplified flow diagram of at least one embodiment of a method that may be performed by the edge gateway device of FIG. 1 for prefetching resources from a target entity at an edge location.

Referring now to FIG. 4, the edge gateway device 114, in operation, may execute a method 400 for prefetching resources from a target entity at an edge location as requested by an edge device 110. As shown, the method 400 begins in block 402, in which the edge gateway device 114 receives a request from an edge device 110 to send, to a target entity, a request to prefetch resources. Such a scenario may occur wherein the edge device 110 is currently communicating with a service at a given origin entity and is leaving an area beyond the network coverage of that origin entity and moving towards the target entity. For example, in such a scenario, the edge device 110 can represent an autonomous vehicle currently requesting image comparison data from an edge resource such as a cell tower. As the autonomous vehicle moves away from that cell tower, the autonomous vehicle may still need image comparison data for subsequent road covered, and thus may request such data from another cell tower that may be coming closer in network proximity as the autonomous vehicle moves forward. To address this, the edge device 110 may send the prefetch request to the edge gateway device 114 to allow the other cell tower to retrieve or generate the requested data in advance.

For example, in block 404, the edge gateway device 114 may receive the prefetch request, in which the request specifies a deadline or some specified amount of time within which the prefetch request should be processed by the target entity. In such instances, the edge device 110 may require that the target entity only prefetch the resources if the target entity is capable of doing so within that specified amount of time. As another example, in block 406, the edge gateway device 114 may receive the prefetch request, in which the request includes positioning data associated with the edge device 110. The positioning data may indicate a location and direction of the edge device 110 at the time of request. The edge gateway device 114 may use the positioning data (and potentially other positioning data previously provided by the edge device 110) to determine the target entity to which to assign the prefetch request. As yet another example, in block 408, the edge gateway device 114 may receive the prefetch request, in which the request specifies one or more of a range of data to receive from an entity, a specification of a tier origin entity (e.g., which entity is currently serving the edge device 110), a tier target entity (e.g., a specification of a tier and/or target entity to prefetch the specified range of data). The range of data may include, e.g., data generated or collected within a specified time frame, within a specified radius, etc.

In block 410, the edge gateway device 114 transmits the prefetch request to the target entity. In other cases, the edge gateway device 114 may generate a prefetch request based on the request sent by the edge device 110. In turn, the target entity may receive the prefetch request and send an indication to the edge gateway device 114 regarding whether the target entity is available to fulfill the request. For example, the target entity may be unable to fulfill the request in the event that the target entity is already processing a maximum amount of service requests for other edge devices 110. As another example, the target entity may be unable to fulfill the request in the event that the target entity is not capable of fulfilling the request within a time period specified in the request.

The edge gateway device 114 may receive the indication from the target entity. In block 412, the edge gateway device 114 determines, based on the indication, whether the target entity is available to fulfill the request. If so, then in block 414, the edge gateway device 114 returns an acknowledgement to the edge device 110 of the prefetch request. If not, then in block 416, the edge gateway device 114 returns a response to the edge device 110 indicating that the target entity is not available to service the request in advance. In such a case, the edge device 110 may later request the desired resources from the target entity when in network proximity of the target entity.

In an embodiment, the target entity may prefetch encrypted data, subject to security constraints. For example, the target entity may require that decryption of the encrypted data be performed inside a hardened environment (e.g., a trusted execution environment). Further, the target entity may decrypt the data relatively close to the time of use. It is preferable that data is decrypted on an endpoint system, e.g., of a tenant device associated with the requested resources.

Figure 5:
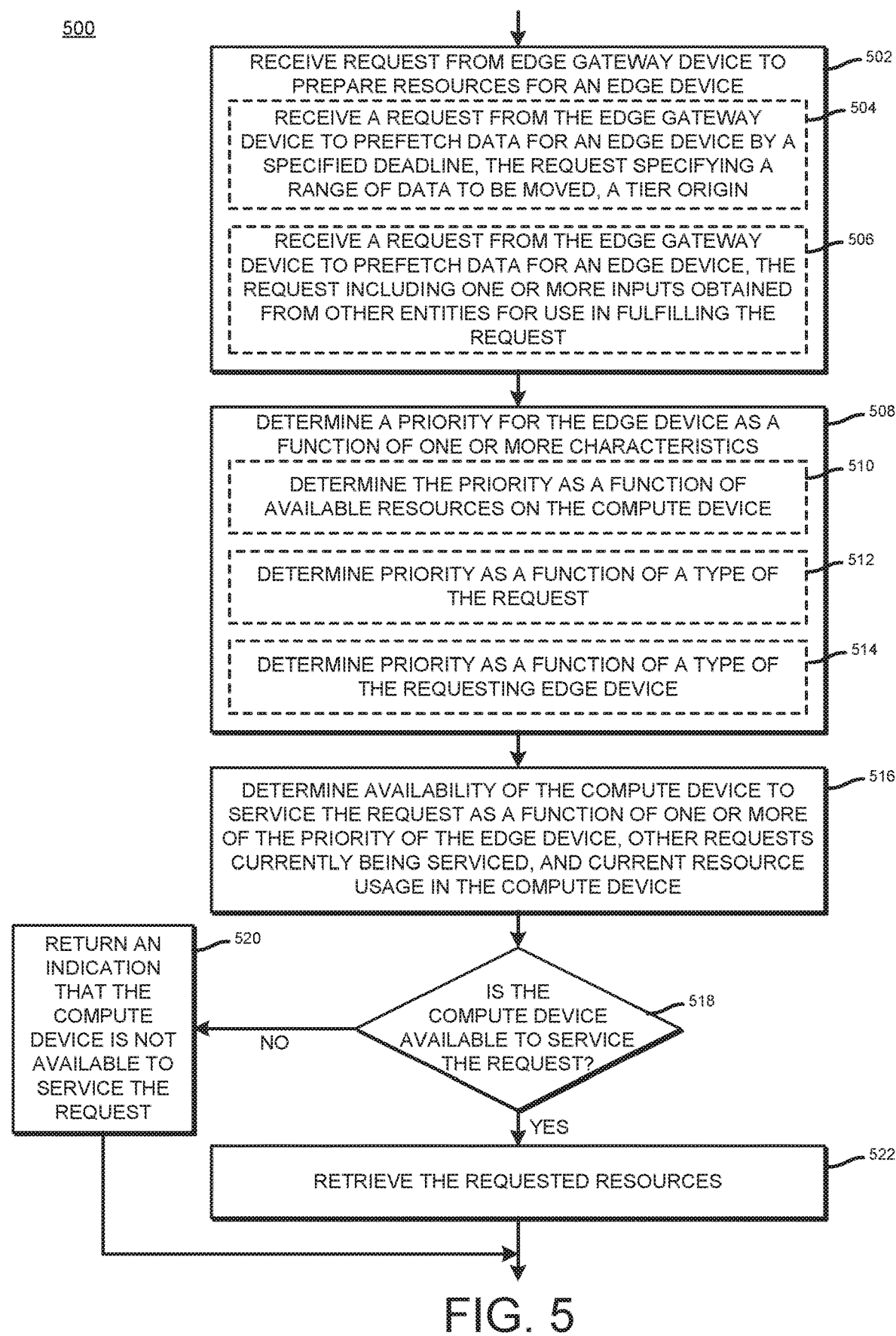
FIG. 5 is a simplified flow diagram of at least one embodiment of a method that may be performed by an edge device for processing requests from an edge gateway device to prefetch resources.

Referring now to FIG. 5, an entity compute device on an edge resource 150, 152, 154 (or one of the fog or edge nodes 180 or the core data center 190) may perform a method 500 for processing requests from an edge gateway device to prefetch resources. As shown, the method 500 begins in block 502, in which the compute device receives a request from the edge gateway device 114 to prefetch resources for an edge device 110. Note, although the request described in this example method 500, one of ordinary skill in the art will recognize that such prefetch requests may originate from other sources, such as devices at intermediate tiers between the edge device 110 and an entity hosting a given service.

For example, in block 504, the compute device may receive a request from the edge gateway device 114 to prefetch data for the edge device 110 (or other device at an intermediate tier of the system 100), in which the request specifies a deadline (e.g., a time frame within which to serve the data for the edge device 110). In addition, the request may also specify a range of data to transfer to the edge device 110, and a tier origin entity. As another example, in block 506, the compute device may receive the request from the edge gateway device 114, in which the request includes one or more additional inputs obtained from other entities in the system 100.

In block 508, the compute device determines a priority for the edge device 110 as a function of one or more characteristics. More particularly, the compute device may prioritize a prefetch request in events where the request competes with other requests being processed by the compute device. Such requests may include other prefetch requests or service requests by other edge devices 110. As an example, in block 510, the compute device may determine the priority as a function of available resources on the compute device, e.g., compute resources, network resources, and the like, to process the prefetch request. As another example, in block 512, the compute device may determine priority as a function of the type of request. For instance, the compute device may prioritize requests to prefetch data associated with a given service over data associated with another service. As yet another example, in block 514, the compute device determines priority as a function of the type of the requesting edge device. For instance, the compute device may prioritize requests to prefetch data associated with a given class of edge devices 110 over another class.

In block 516, the compute device determines the availability of the compute device to service the request as a function of one or more of the priority of the edge device 110, other requests being serviced by the compute device, and current resource usage in the compute device. In block 518, the compute device determines whether the compute device is available to service the request. If so, then in block 520, the compute device returns an indication that the compute device is not available to service the request. Otherwise, in block 522, the compute device retrieves the requested resources. The compute device may forward the requested resources upon request by the edge device 110 for the resources. In other cases, the compute device may provide the resources to the edge gateway device 114, which, in turn, may transmit the resources to the requesting edge device 110.

Figure 6:
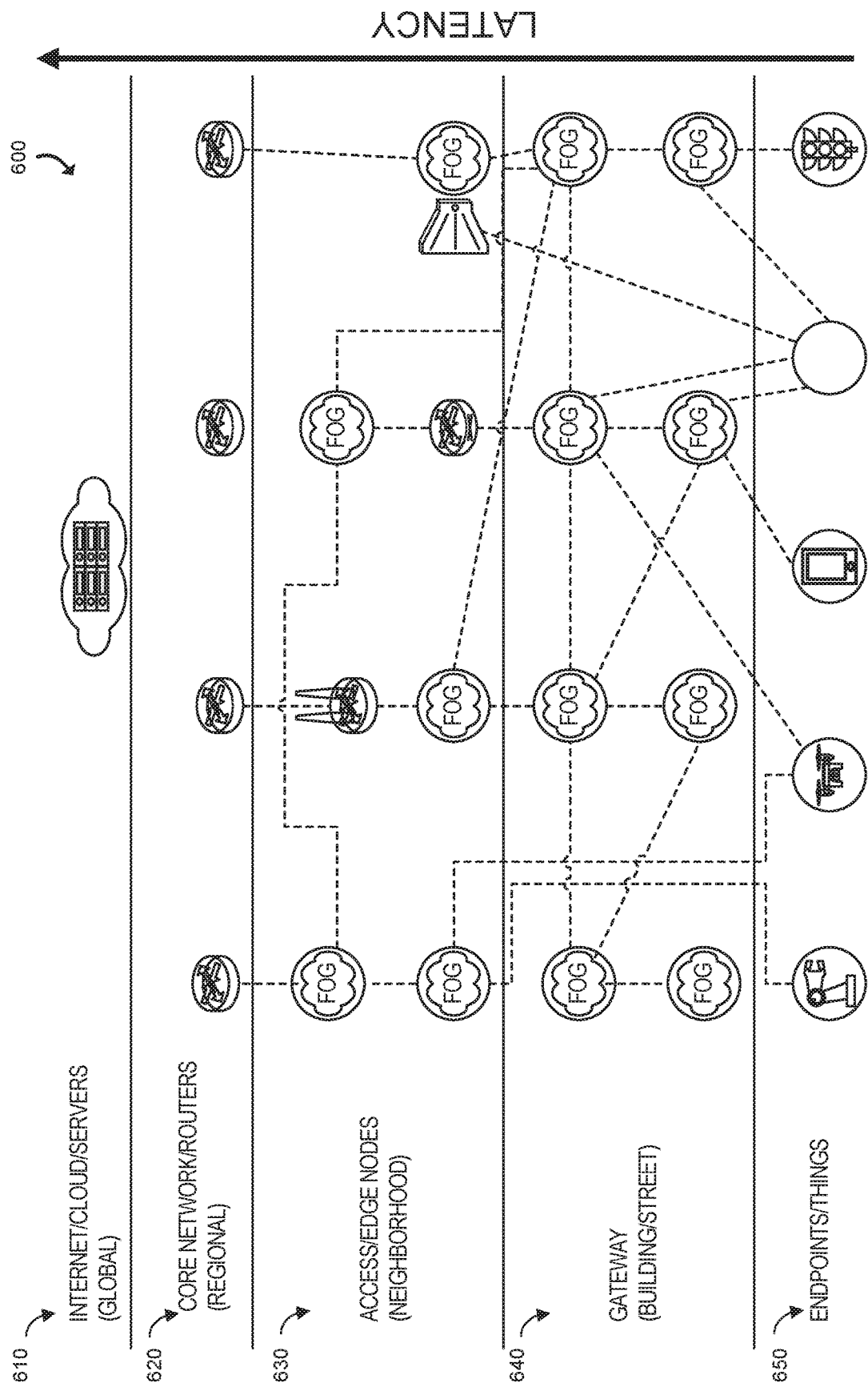
FIG. 6 is a simplified block diagram of a fog and mobile edge computing (MEC) network topology that may be utilized with the system of FIG. 1.

Referring briefly to FIG. 6, a MEC and fog network topology 600 is shown. The network topology 600 includes endpoints (at an endpoints/things network layer 650), gateways (at a gateway layer 640), access or edge computing nodes (e.g., at neighborhood nodes layer 630), core network or routers (e.g., at a regional or central office layer 620). A fog network (e.g., established at the gateway layer 640) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE or 5G core network), among others. In this context, FIG. 6 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

In addition to the MEC implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a computing device, comprising circuitry to receive a request to perform a function of a service by an entity hosting the service; identify one or more input data to fulfill the request by the service; request the one or more input data from an edge resource identified to provide the input data; and provide the input data to the entity associated with the request.

Example 2 includes the subject matter of Example 1, and wherein to identify the one or more input data required to fulfill the request by the service comprises to identify the service to fulfill the request; and execute preprocessing code associated with the identified service to identify the edge resource to provide the one or more input data.

Example 3 includes the subject matter of any of Examples 1 and 2, and wherein to request the one or more input data from the edge resource comprises to execute preprocessing code associated with the identified service to send the request for the one or more input data to the edge resources.

Example 4 includes the subject matter of any of Examples 1-3, and wherein to provide the input data to the entity hosting the service comprises to receive the one or more input data from the edge resources; and send the input data to the edge resources.

Example 5 includes the subject matter of any of Examples 1-4, and wherein the circuitry is further to receive a request to send, to a target entity, a request to prefetch one or more resources; and transmit the request to the target entity to fulfill the request.

Example 6 includes the subject matter of any of Examples 1-5, and wherein to receive the request to send the request to prefetch the one or more resources comprises to receive a request to prefetch the one or more resources by a specified deadline.

Example 7 includes the subject matter of any of Examples 1-6, and wherein to receive the request to send the request to prefetch the one or more resources comprises to receive a request from an edge device to prefetch the one or more resources, the request including positioning data associated with the edge device, in which the target entity is identified as a function of the positioning data.

Example 8 includes the subject matter of any of Examples 1-7, and wherein to receive the request to send the request to prefetch the one or more resources comprises to receive a request to prefetch the one or more resources, the request specifying one or more of a range of data, a tier origin entity, and a tier target entity.

Example 9 includes the subject matter of any of Examples 1-8, and wherein the circuitry is further to determine whether the target entity is available to service the request to prefetch the one or more resources.

Example 10 includes the subject matter of any of Examples 1-9, and wherein the circuitry is further to, upon a determination that the target entity is unavailable to service the request to prefetch the one or more resources, send a response to the request indicating that the target entity is not available to prefetch the one or more resources.

Example 11 includes a system comprising one or more processors; and a memory comprising a plurality of instructions, which, when executed on the one or more processors, causes the system to receive a request to perform a function of a service by an entity hosting the service; identify one or more input data to fulfill the request by the service; request the one or more input data from an edge resource identified to provide the input data; and provide the input data to the entity associated with the request.

Example 12 includes the subject matter of Example 11, and wherein to identify the one or more inputs required to fulfill the request by the service comprises to identify the service to fulfill the request; and execute preprocessing code associated with the identified service to identify the edge resource to provide the one or more input data.

Example 13 includes the subject matter of any of Examples 11 and 12, and wherein to request the one or more input data from the edge resource comprises to execute preprocessing code associated with the identified service to send the request for the one or more input data to the edge resources.

Example 14 includes the subject matter of any of Examples 11-13, and wherein to provide the input data to the entity hosting the service comprises to receive the one or more input data from the edge resources; and send the input data to the edge resources.

Example 15 includes the subject matter of any of Examples 11-14, and wherein the plurality of instructions further causes the system to receive a request to send, to a target entity, a request to prefetch one or more resources; and transmit the request to the target entity to fulfill the request.

Example 16 includes the subject matter of any of Examples 11-15, and wherein to receive the request to send the request to prefetch the one or more resources comprises to receive a request to prefetch the one or more resources by a specified deadline.

Example 17 includes the subject matter of any of Examples 11-16, and wherein to receive the request to send the request to prefetch the one or more resources comprises to receive a request from an edge device to prefetch the one or more resources, the request including positioning data associated with the edge device, in which the target entity is identified as a function of the positioning data.

Example 18 includes the subject matter of any of Examples 11-17, and wherein to receive the request to send the request to prefetch the one or more resources comprises to receive a request to prefetch the one or more resources, the request specifying one or more of a range of data, a tier origin entity, and a tier target entity.

Example 19 includes the subject matter of any of Examples 11-18, and wherein the plurality of instructions further causes the system to determine whether the target entity is available to service the request to prefetch the one or more resources; and upon a determination that the target entity is unavailable to service the request to prefetch the one or more resources, send a response to the request indicating that the target entity is not available to prefetch the one or more resources.

Example 20 includes one or more machine-readable storage media comprising a plurality of instructions stored thereon that, in response to being executed, causes a device to receive a request to perform a function of a service by an entity hosting the service; identify one or more input data to fulfill the request by the service; request the one or more input data from an edge resource identified to provide the input data; and provide the input data to the entity associated with the request.

What is claimed is:
1. A computing device, comprising:
 memory; and
 circuitry to:
  receive a first request to perform a function of a service by an entity hosting the service;
  identify one or more input data to fulfill the first request by the service;
  request the one or more input data from an edge resource identified to provide the input data;

provide the input data to the entity associated with the first request;
receive, from an edge device, a second request to send a third request to a target entity to prefetch one or more resources, the second request including positioning data associated with the edge device, the target entity identified as a function of the positioning data; and
transmit the third request to the target entity to fulfill the second request.

2. The computing device of claim 1, wherein to identify the one or more input data to fulfill the first request by the service, the circuitry is to:
identify the service to fulfill the first request; and
execute preprocessing code associated with the identified service to identify the edge resource to provide the one or more input data.

3. The computing device of claim 1, wherein to request the one or more input data from the edge resource, the circuitry is to execute preprocessing code associated with the service to send the request for the one or more input data to the edge resource.

4. The computing device of claim 1, wherein to provide the input data to the entity hosting the service, the circuitry is to:
receive the one or more input data from the edge resource; and
send the input data to the edge resource.

5. The computing device of claim 1, wherein to receive the second request to send the third request to prefetch the one or more resources, the circuitry is to receive the second request to prefetch the one or more resources by a specified deadline.

6. The computing device of claim 1, wherein the circuitry is to receive in the second request information indicative of one or more of a range of data, a tier origin entity, or a tier target entity.

7. The computing device of claim 1, wherein the circuitry is further to determine whether the target entity is available to service the third request to prefetch the one or more resources.

8. The computing device of claim 7, wherein the circuitry is further to, upon a determination that the target entity is unavailable to service the third request to prefetch the one or more resources, send a response to the third request indicating that the target entity is not available to prefetch the one or more resources.

9. A system comprising:
one or more processors; and
memory including a plurality of instructions, which, when executed on the one or more processors, causes the system to:
receive a first request to perform a function of a service by an entity hosting the service;
identify one or more input data to fulfill the first request by the service;
request the one or more input data from an edge resource identified to provide the input data;
provide the input data to the entity associated with the first request;
receive, from an edge device, a second request to send a third request to a target entity to prefetch one or more resources, the second request including positioning data associated with the edge device, the target entity is-identified as a function of the positioning data; and
transmit the third request to the target entity to fulfill the second request.

10. The system of claim 9, wherein to identify the one or more input data to fulfill the first request by the service, the instructions cause the system to:
identify the service to fulfill the first request; and
execute preprocessing code associated with the identified service to identify the edge resource to provide the one or more input data.

11. The system of claim 9, wherein to request the one or more input data from the edge resource, the instructions cause the system to execute preprocessing code associated with the service to request the one or more input data from the edge resource.

12. The system of claim 9, wherein to provide the input data to the entity hosting the service, the instructions cause the system to:
receive the one or more input data from the edge resource; and
send the input data to the edge resource.

13. The system of claim 9, wherein to receive the second request to send the third request to prefetch the one or more resources, the instructions cause the system to receive the second request to prefetch the one or more resources by a specified deadline.

14. The system of claim 9, wherein the second request specifies one or more of a range of data, a tier origin entity, or a tier target entity.

15. The system of claim 9, wherein the plurality of instructions further causes the system to:
determine whether the target entity is available to service the third request to prefetch the one or more resources; and
upon a determination that the target entity is unavailable to service the third request to prefetch the one or more resources, send a response to the third request indicating that the target entity is not available to prefetch the one or more resources.

16. One or more non-transitory, machine-readable storage media comprising a plurality of instructions stored thereon that, in response to being executed, causes a device to:
receive a first request to perform a function of a service by an entity hosting the service;
identify one or more input data to fulfill the first request by the service;
request the one or more input data from an edge resource identified to provide the input data;
provide the input data to the entity associated with the first request;
receive, from an edge device, a second request to send a third request to a target entity to prefetch one or more resources, the second request including positioning data associated with the edge device, the target entity is-identified as a function of the positioning data; and
transmit the third request to the target entity to fulfill the second request.

* * * * *